United States Patent

[11] 3,622,118

[72] Inventor Walter Schadler
Triesen Nr. 353, Liechtenstein
[21] Appl. No. 885,209
[22] Filed Dec. 15, 1969
[45] Patented Nov. 23, 1971
[73] Assignee Balzers Patent-Und Beteiligungs-AG
Balzers, Liechtenstein
[32] Priority Dec. 20, 1968
[33] Switzerland
[31] 19492/68

[54] VALVE CONSTRUCTION
2 Claims, 2 Drawing Figs.
[52] U.S. Cl. .................................................. 251/81
[51] Int. Cl. ............................................. F16d 23/00,
F16d 7/02, F16d 43/20
[50] Field of Search .......................................... 192/41, 54;
251/81; 64/27, 28

[56] References Cited
UNITED STATES PATENTS
2,608,377  8/1952  Streun ........................... 251/81
2,685,949  8/1954  Dunlap .......................... 192/41
2,831,648  4/1958  Meyer et al. ................... 251/81

FOREIGN PATENTS
54,408  7/1912  Austria ........................ 251/81

Primary Examiner—Henry T. Klinksiek
Attorney—McGlew and Toren

ABSTRACT: A valve, particularly for controlling gas flow, includes a needle valve which is movable toward and away from engagement with its associated valve seat by a threaded spindle. The spindle is rotated by driving means which is connected thereto through a friction coupling. The driving is effected by means of a handle which is rotatably mounted on an extension of the spindle and which is biased toward engagement with a coupling disc which is mounted on the spindle for rotation therewith. An intermediate plastic disc coupling member disposed between the coupling disc and the rotatable handle provides for the frictional transmission of the torque in dependence upon the setting of the spring means for urging the handle into engagement with the intermediate disc. The coupling arrangement insures that the valve will only be closed with permissible closing pressures which will not be exceeded. In order to provide for a larger driving torque when the valve is moved in an opening direction a coil spring is coupled between the driving member and the coupling disc which is moved to contract and provide tight frictional engagement with the disc in the opening direction only.

PATENTED NOV 23 1971
3,622,118
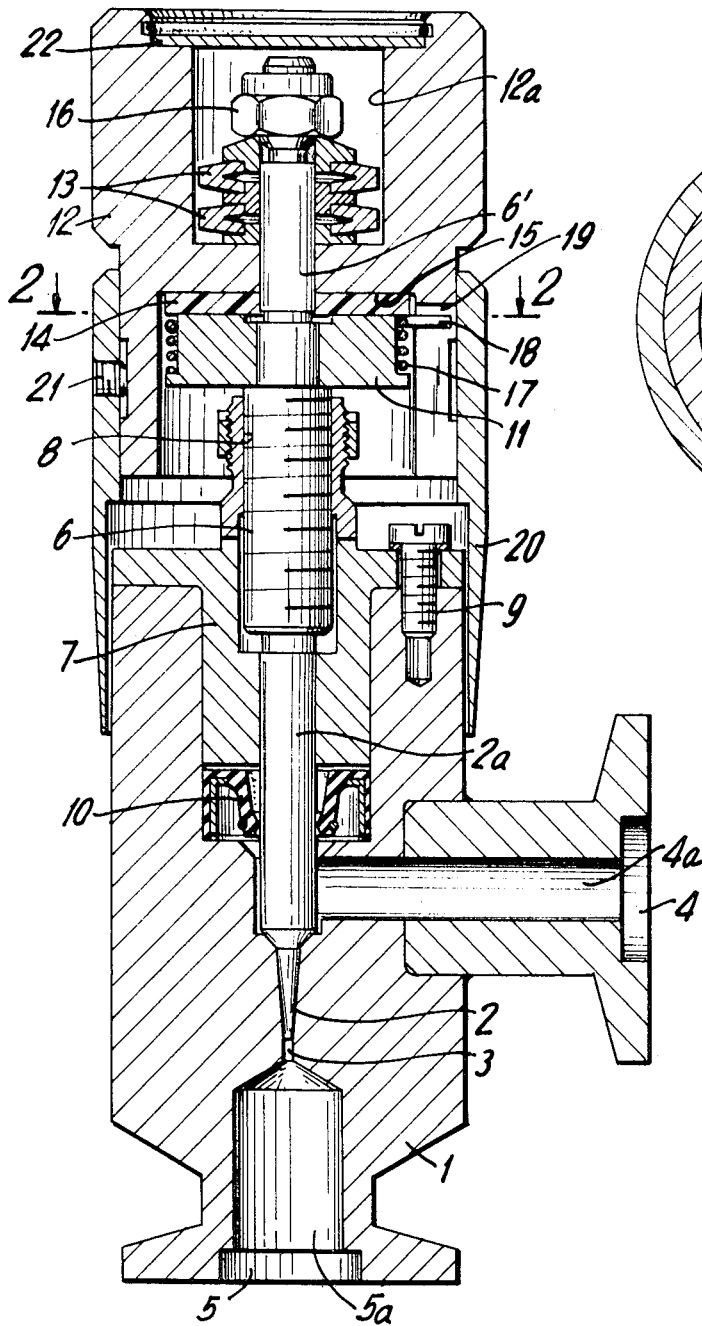
FIG.1
FIG.2
INVENTOR.
WALTER SCHÄDLER
BY
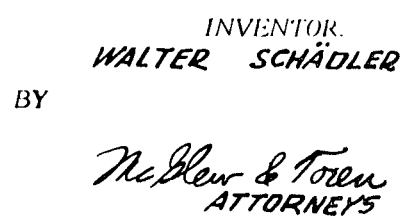
ATTORNEYS 3,622,118

VALVE CONSTRUCTION

SUMMARY OF THE INVENTION

This invention relates in general to the construction of valves and in particular to a new and useful valve, particularly for the control of gas flow which includes a rotatable member which is operated for moving the valve toward and away from its associated valve seat and which is rotated by a driving member through a friction coupling.

Particularly for vacuum operations, it is essential that exact dosages of gas be effected, especially, for example, in mass spectroscopy and generally in chemical-physical tests and investigations. So-called needle valves are generally employed for gas control where exact dosage is required. Such needle valves include a closure body in the form of a needlepoint which is adjustable or settable by means of a threaded spindle or rotatable driving member relative to a bore which serves as a valve seat. The position of the needlepoint determines the amount of gas that flows through the valve. It is very difficult to construct needle valves with the precision necessary to conduct small amounts of gas in a definite and reproducible quantity. This is because both the needlepoint and the bore which serves as a valve seat have a tendency to become deformed.

In accordance with the present invention there is provided a valve, particularly for gas dosing, which permits excellent reproducibility in respect to the conveyance of gas volumes in a wide range and which can be produced very inexpensively. With the valve of the invention there is no danger that one has to use very hard closing pressures. The valve member or valve closing body is mounted for movement toward and away from a valve seat defined in a valve casing. When the valve body is closed against the seat the pressing of the valve body is accomplished by means of a threaded spindle or rotatable member which is displaced axially in directions toward and away from the associated seat. Driving means in the form of a rotatable handle is arranged for frictional coupling with the driving spindle, the frictional setting of which may be adjusted by varying the tension of disc springs which bias the rotatable handle into engagement with an intermediate plastic disc coupling member. The frictional coupling pressure between the rotatable handle and the spindle which moves the valve body may thus be varied in accordance with the adjustment of spring biasing means acting between the driving handle and a coupling disc for transmitting the driving torque to the spindle. In accordance with another arrangement of the invention a coil spring is employed between the rotatable driving handle and the coupling disc for the spindle and which has windings which will contract into frictional engagement with the disc when the handle is moved in a direction to open the valve in order to permit the application of a large torque in the opening direction.

Accordingly, it is an object of the invention to provide an improved valve construction, particularly a needle valve for use in the dosage of gases which includes a rotatable spindle for moving the valve body toward and away from engagement with its associated valve seat and a driving member which is engaged with the spindle through a frictional coupling.

A further object of the invention is to provide a gas dosage valve having a frictional coupling means for engaging and disengaging a valve body in a valve seat.

A further object of the invention is to provide a valve construction which is simple in design, rugged in construction, and economical to manufacture.

For an understanding of the principles of the invention, reference is made to the following description of a typical embodiment thereof as illustrated in the accompanying drawings.

BRIEF DESCRIPTION OF THE DRAWINGS

In the drawings:

FIG. 1 is a longitudinal sectional view of a valve constructed in accordance with the invention; and FIG. 2 is a section taken on the lines 2—2 of FIG. 1.

GENERAL DESCRIPTION OF THE PREFERRED EMBODIMENT

Referring to the drawings in particular, the invention embodied therein comprises a valve particularly useful in controlling the flow of a gas and which includes a valve casing 1 having an inlet fitting 4 with a gas passage 4a and an outlet fitting portion 5 having a gas passage or discharge 5a. The valve casing defines a needle bore 3 which defines a valve seat for a needle valve member or valve closure body 2. A guide flange member 7 is arranged within a receiving bore of one end of the valve casing and provides an axial guide for a uniform diameter portion 2a of the valve closure body 2. A ring seal 10 is arranged between the guide flange 7 and the valve casing 1.

In accordance with the invention the valve closure body is moved in directions toward and away from engagement with its associated valve seat 3 by a rotatable threaded spindle 6 which is formed as an extension of a closure body 2. The threaded spindle 6 is threadable engaged in a threaded bore of a nut 8 which is mounted in a fixed position above the guide flange 7. The flange 7 is connected with the valve casing by one or more screw members or bolts 9. The invention includes driving means for drivingly engaging the threaded spindle to cause it to rotate and to displace it axially in either a downward closing direction or upwardly in an opening direction. For this purpose the spindle 6 is provided with an upper extension which is fixed to a disc 11 for rotation therewith. The disc 11 is a driven disc which is rotated by a rotatable drive member or handle 12 which is rotatably supported around a spindle extension 6'. The handle 12 includes an interior cavity 12a and it is biased in an axial direction toward a coupling disc 11 by biasing means in the form of disc springs 13 which are accommodated in the cavity 12a. The drive member 12 bears against an intermediate plastic disc or coupling force transmission member 14 which has an opposite face which bears against the coupling disc 11. The disc 11 is affixed to the spindle 6 for rotation therewith. The frictional coupling engagement force may be varied by adjusting the compression force of the disc springs 13 by the setting of a nut member 16 which is threaded on the end of the spindle extension 6'.

Upon turning or rotating of handle part 12 because of the frictional engagement between the surface 15 and the plastic disc 14 and between the disc 14 and the coupling disc 11, a rotational moment or torque is transmitted to the threaded spindle 6. This torque has a maximum amount which is limited by the frictional coupling. This frictional coupling can be easily adjusted by changing the position of the nut 16 on its associated spindle extension 6'. This adjustment is set to correspond to the maximum permissible bearing pressure of the valve closure body 2 on its associated valve seat 3. In this manner it is assured that the permissible closing pressure will not be exceeded.

In accordance with another feature of the invention the driving member 12 is connectable to the spindle 6 for moving the valve in an opening direction by engagement of a spring 17 between the driving member 12 and the coupling disc 11. For this purpose the spring 17 comprises a coil spring having one end which is engaged with the driving member 12 and an opposite end which is wound around a portion of the exterior periphery of the coupling disc 11. During rotation of the driving member 12 in a closing direction, the coils of the spring are loosened so that there is no driving engagement of the spring 17 with the coupling disc 11. In an opening direction however, the coils of the spring 17 are tightened so that the coupling disc is positively connected to the driving member 12 for rotation therewith so that a large opening torque may be effected. This ensures that the valve may be opened even though it has become stuck because it is wedged in position due to a long period of nonuse or because it is closed by dirt or other reasons. The spring 17 does not influence the closing of the valve since the tendency is to loosen the coupling disc when the member 12 is rotated in this direction.

A scale drum 20 is arranged between the driving member 12 and the valve casing 1, and it is provided with calibrations on its exterior surface which may be aligned with an indexing mark, for example, which may be defined on the valve casing 1. The scale drum is connected for rotation with the driving member 12 through a setscrew 21. The indications on the scale drum 20 are calibrated for various gas amounts so that the setting of the valve may be reproduced for subsequent operations. During closing of the valve the scale drum 20 may be set such that a zero valve is effected during the closing of the valve and that the exact reproducible scale setting is set upon opening of the valve to yield the desired gas flow. This setting will not vary even though the valve closure body 2 or the associated valve seat 3 has become deformed, after a long period of use, or by inappropriate handling. The known needle valves, in contrast with the present invention, have the important disadvantage that the scale setting corresponding to a predetermined spindle position cannot be associated exactly with a defined predetermined constant gas-conveying capability. In particular, the setting for very small gas amounts becomes very inexact on the scale.

The cavity 12a is advantageously closed by a cover member 22.

What is claimed is:

1. A gas dosage valve comprising a valve casing having an inlet passage, an outlet passage and a valve seat between said passages, a valve closure body rotatably supported in said casing and being axially displaceable toward and away from engagement with said valve seat, a threaded spindle connected to said valve closure member for rotation therewith and axial displacement therewith, a nut member secured to said casing and threadably engaged with said threaded spindle, said spindle having an extension portion extending away from said valve closure body, a driving member rotatably supported on said extension portion, a coupling disc affixed to said spindle for rotation therewith, adjustable spring means urging said driving member in a direction to drivingly engage said coupling disc and to rotate said spindle member when said driving member is rotated for displacing said valve closure body, and a coil spring disposed around said coupling disc and connected to said driving member, said coil spring being unwound when said driving member is rotated in a direction to move said valve closure body into a closed portion engaged with said valve seat and to wind and frictionally engage between said driving member and said coupling disc to rotate said spindle when said driving member is rotated in a direction to open said valve closure body by moving it away from the associated set valve seat.

2. A gas dosage valve, according to claim 1 wherein said biasing means comprises a disc spring arranged around said spindle extension, and a nut member threaded on said extension and engageable with said disc spring for varying the compressive force thereon and the frictional engagement of said driving member with said coupling disc.

* * * * *